(12) United States Patent
Sanli et al.

(10) Patent No.: US 8,271,318 B2
(45) Date of Patent: Sep. 18, 2012

(54) SYSTEMS AND METHODS FOR MARKDOWN OPTIMIZATION WHEN INVENTORY POOLING LEVEL IS ABOVE PRICING LEVEL

(75) Inventors: Tugrul Sanli, Cary, NC (US); Xiaodong Yao, Cary, NC (US)

(73) Assignee: SAS Institute Inc., Cary, NC (US)

( * ) Notice: Subject to any disclaimer, the term of this patent is extended or adjusted under 35 U.S.C. 154(b) by 537 days.

(21) Appl. No.: 12/412,046

(22) Filed: Mar. 26, 2009

(65) Prior Publication Data
US 2010/0250329 A1 Sep. 30, 2010

(51) Int. Cl.
G06Q 99/00 (2006.01)
(52) U.S. Cl. ....... 705/7.35; 705/1.1; 705/7.27; 705/7.29
(58) Field of Classification Search .............. 705/7.35, 705/1.1, 7.27, 7.29, 7.31
See application file for complete search history.

(56) References Cited

U.S. PATENT DOCUMENTS

| | | |
|---|---|---|
| 5,195,172 A | 3/1993 | Elad et al. |
| 5,319,781 A | 6/1994 | Syswerda |
| 5,627,973 A | 5/1997 | Armstrong et al. |
| 5,652,842 A | 7/1997 | Siegrist, Jr. et al. |
| 5,712,989 A | 1/1998 | Johnson et al. |
| 5,767,854 A | 6/1998 | Anwar |
| 5,799,286 A | 8/1998 | Morgan et al. |
| 5,867,494 A | 2/1999 | Krishnaswamy et al. |
| 5,926,820 A | 7/1999 | Agrawal et al. |
| 5,946,662 A | 8/1999 | Ettl et al. |
| 5,953,707 A | 9/1999 | Huang et al. |
| 5,963,910 A | 10/1999 | Ulwick |
| 5,999,908 A | 12/1999 | Abelow |
| 6,009,407 A | 12/1999 | Garg |
| 6,014,640 A | 1/2000 | Bent |
| 6,023,684 A | 2/2000 | Pearson |
| 6,029,139 A | 2/2000 | Cunningham et al. |
| 6,041,267 A | 3/2000 | Dangat et al. |

(Continued)

FOREIGN PATENT DOCUMENTS

EP 1413955 4/2004

(Continued)

OTHER PUBLICATIONS

Armstrong, Mark, "Multiproduct Nonlinear Pricing", Econometrica, vol. 64, No. 1, pp. 51-75 (Jan. 1996).

(Continued)

*Primary Examiner* — Akiba Allen
(74) *Attorney, Agent, or Firm* — Jones Day

(57) ABSTRACT

Computer-implemented systems and methods generate a near-optimum product markdown plan for a plurality of uniform pricing levels having a required inventory sell-through target over all of the plurality of uniform pricing levels. A plurality of feasible markdown schedules are generated for the uniform pricing level, where each of the plurality of feasible markdown schedules meets all individual constraints for the uniform pricing level. All dominated feasible markdown schedules are removed for the uniform pricing level to generate one or more candidate markdown schedules for the uniform pricing level. A near-optimum product markdown plan is generated, where generating the near-optimum product markdown plans includes executing a limited exact algorithm solver for a plurality of iterations, and executing a dynamic programming solver if no product markdown plan generated by the limited exact algorithm solver is within the threshold percentage of the revenue upper bound.

18 Claims, 14 Drawing Sheets

U.S. PATENT DOCUMENTS

| | | |
|---|---|---|
| 6,076,071 A | 6/2000 | Freeny, Jr. |
| 6,078,892 A | 6/2000 | Anderson et al. |
| 6,115,691 A | 9/2000 | Ulwick |
| 6,151,582 A | 11/2000 | Huang et al. |
| 6,175,876 B1 | 1/2001 | Branson et al. |
| 6,182,060 B1 | 1/2001 | Hedgcock et al. |
| 6,226,623 B1 | 5/2001 | Schein et al. |
| 6,236,977 B1 | 5/2001 | Verba et al. |
| 6,237,138 B1 | 5/2001 | Hameluck et al. |
| 6,263,315 B1 | 7/2001 | Talluri |
| 6,275,812 B1 | 8/2001 | Haq et al. |
| 6,286,005 B1 | 9/2001 | Cannon |
| 6,321,133 B1 | 11/2001 | Smirnov et al. |
| 6,321,206 B1 | 11/2001 | Honarvar |
| 6,397,224 B1 | 5/2002 | Zubeldia et al. |
| 6,456,999 B1 | 9/2002 | Netz |
| 6,470,344 B1 | 10/2002 | Kothuri et al. |
| 6,484,179 B1 | 11/2002 | Roccaforte |
| 6,526,526 B1 | 2/2003 | Dong et al. |
| 6,546,135 B1 | 4/2003 | Lin et al. |
| 6,553,352 B2 | 4/2003 | Delurgio et al. |
| 6,560,501 B1 | 5/2003 | Walser et al. |
| 6,581,068 B1 | 6/2003 | Bensoussan et al. |
| 6,584,447 B1 | 6/2003 | Fox et al. |
| 6,611,829 B1 | 8/2003 | Tate et al. |
| 6,640,215 B1 | 10/2003 | Galperin et al. |
| 6,643,659 B1 | 11/2003 | MacIssac et al. |
| 6,728,724 B1 | 4/2004 | Megiddo et al. |
| 6,735,570 B1 | 5/2004 | Lacy et al. |
| 6,750,864 B1 | 6/2004 | Anwar |
| 6,898,603 B1 | 5/2005 | Petculescu et al. |
| 6,901,406 B2 | 5/2005 | Nabe et al. |
| 6,907,382 B2 | 6/2005 | Urokohara |
| 6,970,830 B1 | 11/2005 | Samra et al. |
| 7,039,594 B1 | 5/2006 | Gersting |
| 7,062,447 B1 | 6/2006 | Valentine et al. |
| 7,068,267 B2 | 6/2006 | Meanor et al. |
| 7,085,734 B2 | 8/2006 | Grant et al. |
| 7,089,266 B2 | 8/2006 | Stolte et al. |
| 7,092,896 B2 | 8/2006 | Delurgio et al. |
| 7,092,918 B1 | 8/2006 | Delurgio et al. |
| 7,092,929 B1 | 8/2006 | Delurgio et al. |
| 7,130,811 B1 | 10/2006 | Delurgio et al. |
| 7,133,876 B2 | 11/2006 | Roussopoulos et al. |
| 7,133,882 B1 | 11/2006 | Pringle et al. |
| 7,171,376 B2 | 1/2007 | Ramakrishnan |
| 7,236,949 B2 | 6/2007 | Natan et al. |
| 7,240,019 B2 | 7/2007 | Delurgio et al. |
| 7,249,031 B2 | 7/2007 | Close et al. |
| 7,251,615 B2 | 7/2007 | Woo |
| 7,302,400 B2 | 11/2007 | Greenstein |
| 7,302,410 B1 | 11/2007 | Venkatraman et al. |
| 7,310,646 B2 | 12/2007 | Rangadass et al. |
| 7,346,538 B2 | 3/2008 | Reardon |
| 7,370,366 B2 | 5/2008 | Lacan et al. |
| 7,379,890 B2 | 5/2008 | Myr et al. |
| 7,395,255 B2 | 7/2008 | Li |
| 7,440,903 B2 | 10/2008 | Riley et al. |
| 7,505,482 B2 | 3/2009 | Adamczyk et al. |
| 7,519,908 B2 | 4/2009 | Quang et al. |
| 7,536,361 B2 | 5/2009 | Alberti et al. |
| 7,617,119 B1 | 11/2009 | Neal et al. |
| 7,689,456 B2 | 3/2010 | Schroeder et al. |
| 7,752,067 B2 | 7/2010 | Fotteler et al. |
| 7,756,945 B1 | 7/2010 | Andreessen et al. |
| 7,798,399 B2 | 9/2010 | Veit |
| 7,877,286 B1 * | 1/2011 | Neal et al. ............... 705/7.31 |
| 7,895,067 B2 | 2/2011 | Ramakrishnan |
| 2002/0013757 A1 | 1/2002 | Bykowsky et al. |
| 2002/0046096 A1 | 4/2002 | Srinivasan et al. |
| 2002/0072953 A1 | 6/2002 | Michlowitz et al. |
| 2002/0099678 A1 | 7/2002 | Albright et al. |
| 2002/0107723 A1 | 8/2002 | Benjamin et al. |
| 2002/0116237 A1 | 8/2002 | Cohen et al. |
| 2002/0123930 A1 | 9/2002 | Boyd et al. |
| 2002/0169654 A1 | 11/2002 | Santos et al. |
| 2002/0169655 A1 | 11/2002 | Beyer et al. |
| 2002/0178049 A1 | 11/2002 | Bye |
| 2003/0023598 A1 | 1/2003 | Janakiraman et al. |
| 2003/0028437 A1 | 2/2003 | Grant et al. |
| 2003/0050845 A1 | 3/2003 | Hoffman et al. |
| 2003/0078830 A1 | 4/2003 | Wagner et al. |
| 2003/0083924 A1 | 5/2003 | Lee et al. |
| 2003/0083925 A1 | 5/2003 | Weaver et al. |
| 2003/0088458 A1 | 5/2003 | Afeyan et al. |
| 2003/0097292 A1 | 5/2003 | Chen et al. |
| 2003/0110072 A1 | 6/2003 | Delurgio et al. |
| 2003/0110080 A1 | 6/2003 | Tsutani et al. |
| 2003/0120584 A1 | 6/2003 | Zarefoss et al. |
| 2003/0126010 A1 | 7/2003 | Barns-Slavin |
| 2003/0126136 A1 | 7/2003 | Omoigui |
| 2003/0167098 A1 | 9/2003 | Walser et al. |
| 2003/0172145 A1 | 9/2003 | Nguyen |
| 2003/0208402 A1 | 11/2003 | Bibelnieks et al. |
| 2003/0208420 A1 | 11/2003 | Kansal |
| 2003/0220830 A1 | 11/2003 | Myr |
| 2003/0229502 A1 | 12/2003 | Woo |
| 2003/0236721 A1 | 12/2003 | Plumer et al. |
| 2004/0093296 A1 | 5/2004 | Phelan et al. |
| 2004/0103051 A1 | 5/2004 | Reed et al. |
| 2004/0111388 A1 | 6/2004 | Boiscuvier et al. |
| 2004/0111698 A1 | 6/2004 | Soong et al. |
| 2004/0199781 A1 | 10/2004 | Erickson et al. |
| 2005/0033761 A1 | 2/2005 | Guttman et al. |
| 2005/0066277 A1 | 3/2005 | Leah et al. |
| 2005/0096963 A1 | 5/2005 | Myr et al. |
| 2005/0194431 A1 | 9/2005 | Fees et al. |
| 2005/0197896 A1 | 9/2005 | Veit et al. |
| 2005/0198121 A1 | 9/2005 | Daniels et al. |
| 2005/0256726 A1 | 11/2005 | Benson et al. |
| 2005/0256753 A1 | 11/2005 | Veit et al. |
| 2005/0262108 A1 | 11/2005 | Gupta |
| 2005/0267901 A1 | 12/2005 | Irlen |
| 2005/0289000 A1 | 12/2005 | Chiang et al. |
| 2006/0047608 A1 | 3/2006 | Davis et al. |
| 2006/0069598 A1 | 3/2006 | Schweitzer et al. |
| 2006/0074728 A1 | 4/2006 | Schweitzer et al. |
| 2006/0143030 A1 | 6/2006 | Wertheimer |
| 2006/0248010 A1 | 11/2006 | Krishnamoorthy et al. |
| 2007/0055482 A1 | 3/2007 | Goodermote et al. |
| 2007/0100981 A1 | 5/2007 | Adamczyk et al. |
| 2007/0174119 A1 | 7/2007 | Ramsey et al. |
| 2007/0223462 A1 | 9/2007 | Hite et al. |
| 2007/0288296 A1 | 12/2007 | Lewis |
| 2008/0077459 A1 | 3/2008 | Desai et al. |
| 2008/0140581 A1 * | 6/2008 | Mayer ............................ 705/80 |
| 2008/0140688 A1 | 6/2008 | Clayton et al. |
| 2008/0208678 A1 * | 8/2008 | Walser et al. .................. 705/10 |
| 2008/0208719 A1 | 8/2008 | Sharma et al. |
| 2009/0271241 A1 | 10/2009 | Pratt |

FOREIGN PATENT DOCUMENTS

| | | |
|---|---|---|
| WO | 0111522 | 2/2001 |
| WO | 2007/002841 | 1/2007 |

OTHER PUBLICATIONS

Balintfy et al, Binary and Chain Comparisons with an Experimental Linear Programming Food Price Index, The Review of Economics and Statistics, vol. 52, No. 3, pp. 324-330 (Aug. 1970).

Baud, Nicolas et al., "Internal data, external data and consortium data for operational risk measurement: How to pool data properly?", Groupe de Recherche Operationnelle, Credit Lyonnais, France, pp. 1-18 (Jun. 1, 2002).

Beamon, "Supply chain design and analysis: models and methods," International Journal of Production Economics (1998).

Chettri, Inderlal Singh et al., "Pre Pack Optimization: Increasing Supply Chain Efficiency", Cognizant Technology Solutions, pp. 1-26 (undated).

Cohen et al., "SAS/OR Optimization Procedures, with Applications to the Oil Industry," SAS Institute, SUGI Proceedings (1994).

Cook et al., "Evaluating Suppliers of Complex Systems: A multiple criteria approach," The Journal of the Operational Research Society (Nov. 1992).

De Prisco et al., "On Optimal Binary Search Trees", Information Processing Letters, vol. 45, pp. 249-253 (Apr. 1993).

Hollander, Geoffrey, "Modell deftly parses customer characteristics", InfoWorld, vol. 20, No. 21, pp. 1-4, retrieved from Dialog, file 148 (May 25, 1998).
Horngren, Charles T. et al., "Cost Accounting a Managerial Emphasis", Tenth Edition, Chapter 14, pp. 497-534 (2000).
Johnson et al, Recent Developments and Future Directions in Mathematical Programming, IBM Systems Journal, vol. 31, No. 1, pp. 79-93 (1992).
Kearney, "Advances in Mathematical Programming and Optimization in the SAS System," SAS Institute, SUGI Proceedings (1999).
Kelley, Dave, "Merchandise Intelligence: Predictive insights improve bottom line," RIS News, p. 32 (Mar. 2006).
Lee et al., "An effective supplier development methodology for enhancing supply chain performance," ICMIT (2000).
Lee et al., "Supplier Selection and Management system Considering Relationships in Supply Chain Management," IEEE Transactions on Engineering Management (Aug. 2001).
Manchanda et al, The "Shopping Basket"; A Model for Multi-Category Purchase Incidence Decisions, Marketing Science, vol. 18, pp. 95-114 (Nov. 2, 1999).
Medaglia, Andres, "Simulation Optimization Using Soft Computing," dissertation for Operations Research Department at North Carolina State University (Jan. 24, 2001).
Na, H.S. et al., "Data Scaling for Operational Risk Modelling", ERIM Report Series Research in Management, 24 pp. (Dec. 2005).
Pedersen et al., "Multidimensional Database Technology", IEEE, Computer, vol. 34, Issue 12, pp. 40-46 (Dec. 2001).
Peemoller, Fred A., "Operational Risk Data Pooling", Frankfurt/Main, Deutsche Bank AG, 38 pp. (Feb. 7, 2002).
Porter-Kuchay, Multidimensional Marketing, Target Marketing (Jan. 2000).
Ramirez, Arid Ortiz, "three-Tier Architecture," Linux Journal, downloaded from http://www.linuxjournal.com/article/3508, 4 pp. (Jul. 1, 2000).
Renaud, Jacques et al., "A heuristic for the pickup and delivery traveling salesman problem," Computers & Operations Research, 27, pp. 905-916 (2000).
Rosen, Michele, "There's Gold in That There Data", Insurance & Technology, vol. 23, No. 12, pp. 1-6, , retrieved from Dialog, file 16 (Dec. 1998).
Saarenvirta, Data Mining to Improve Profitability, CMA Magazine, vol. 72, No. 2, pp. 8-12 (Mar. 1998).
Samudhram, Ananda, "Solver setting for optimal solutions," New Straits Times (Nov. 22, 1999).
Schindler et al., "Increased Consumer Sales Response Through Use of 99-ending Prices" Journal of Retailing, vol. 72, pp. 187-199 (1996).
Smith, Michael John Sebastian, "Application-Specific Integrated Circuits," Addison-Wesley Longman, Inc., Chapter 1: Introduction to ASICS, cover page and pp. 20-34.
Spiegelman, "Optimizers Assist in Specialized marketing Efforts," Computer Reseller News (Nov. 22, 1999).

Business Wire, "Perfect and Open Ratings Form Alliance to Provide Critical Supplier Performance Ratings to Private Exchanges and Net Markets" (Oct. 30, 2000).
Business Wire, "SAS and Kohl's Partner on Merchandise Intelligence Suite," downloaded from http://findarticles.com/p/articles/mi_m0EIN/is_2005_Jan_17/ai_n8695858/, 2 pp. (Jan. 17, 2005).
Cognizant Technology Solutions, "Pre Pack Optimization: Increasing Supply Chain Efficiency", pp. 1-26 (undated).
Data Mining News, Looking Past Automation, MarketSwitch Focuses on Optimization of Marketing Campaigns, Data Mining News (May 10, 1999).
"i2 Technologies: i2 releases i2 five.two—the complete platform for dynamic value chain management; flexible, intuitive, powerful solutions designed to help companies gain efficiencies and drive revenue", M2 Presswire (Oct. 25, 2001).
i2 Technologies, Inc., "Improving Service and Market Share with i2 Inventory Optimization: How superior inventory management can be deployed as a competitive weapon to drive the top and the bottom line", pp. 1-26 (Aug. 2004).
Microsoft, MSDN, Chapter 5: Layered Application Guidelines, downloaded from http://msdn.microsoft.com/en-us/library/ee658109(d=printer).aspx (10 pp.).
Microsoft, MSDN, Three-Layered Services Application, downloaded from http://msdn.microsoft.com/en-us/library/ff648105(d=printer).aspx (6 pp.).
Modell by Group 1 Software, www.g1.com, retrieved from Google.com and archive.org., pp. 1-16 (Aug. 29, 1999).
Multitier Architecture definition from Wikipedia (4 pp.).
SAS Institute, Inc., www.sas.com, retrieved from Google.com and archive.org, pp. 1-28 (Jan. 29, 1998).
Millin, Vincent, Jun. 22, 2004 International Search Report from PCT/US03/13394 (1 pg.).
Haupt, J, "Enterprise Wide Data Warehousing with SAP BW," SAP AG, pp. 1-38 (2004).
Howard, Philip, "Data Warehousing with SAS," Bloor Research, pp. 1-13 (2005).
McDonald, Kevin et al., "Masteing the SAP® Business Information Warehouse," Wiley Publishing, Inc., pp. 1-18, 35-88, 279-332 (Sep. 2002).
White, John W., "Making ERP Work the Way Your Business Works," Fuego, ERP White Paper, pp. 1-8 (2002).
Data Model definition from Wikipedia (18 pp.).
Enterprise Application Integration definition from Wikipedia (7 pp.).
Enterprise Information Integration definition from Wikipedia (3 pp.).
Service-Oriented Architecture definition from Wikipedia (19 pp.).
Software as a Service definition from Wikipedia (7 pp.).
Armstrong, Ronald D. et al., "The Multiple-Choice Nested Knapsack Model", Management Science, vol. 28, No. 1, pp. 34-43 (Jan. 1982).
Pisinger, David, "A Minimal Algorithm for the Multiple-Choice Knapsack Problem," Technical Report 94/25, DIKU, University of Copenhagen, Denmark, pp. 1-23 (May 1994).
Bertsimas et al., "Introduction to Linear Optimization" Athena Scientific, Belmont, Massachusetts, 1997, pp. 505-506, 530.

* cited by examiner

| STORE NAME | STORE ID | STARTING INVENTORY | CURRENT PRICE | PRICE COEFFICIENT | BASE FORECAST IN WEEK 1 | BASE FORECAST IN WEEK 2 |
|---|---|---|---|---|---|---|
| STORE A | 1 | 100 | $30 | -1.1 | 25 | 25 |
| STORE A | 2 | 200 | $30 | -2 | 40 | 30 |

TABLE 1

| STORE ID | SCHEDULE ID | PRICE IN WEEK 1 | PRICE IN WEEK 2 | SALES IN WEEK 1 | SALES IN WEEK 2 | TOTAL REVENUE | ENDING INVENTORY |
|---|---|---|---|---|---|---|---|
| 1 | 1 | $30 | $30 | 25 | 25 | $1,500.00 | 50 |
| 1 | 2 | $30 | $20 | 25 | 36 | $1,470.00 | 39 |
| 1 | 3 | $30 | $10 | 25 | 52 | $1,270.00 | 23 |
| 1 | 4 | $20 | $20 | 36 | 36 | $1,440.00 | 28 |
| 1 | 5 | $20 | $10 | 36 | 52 | $1,240.00 | 12 |
| 1 | 6 | $10 | $10 | 52 | 48 | $1,000.00 | 0 |
| 2 | 1 | $30 | $30 | 40 | 30 | $2,100.00 | 130 |
| 2 | 2 | $30 | $20 | 40 | 58 | $2,360.00 | 102 |
| 2 | 3 | $30 | $10 | 40 | 114 | $2,340.00 | 46 |
| 2 | 4 | $20 | $20 | 78 | 58 | $2,720.00 | 64 |
| 2 | 5 | $20 | $10 | 78 | 114 | $2,700.00 | 8 |
| 2 | 6 | $10 | $10 | 152 | 48 | $2,000.00 | 0 |

TABLE 2

Fig. 9

| GROUP ID $i$ | SCHEDULE ID $j$ | ENDING INVENTORY $I_{ij}$ | TOTAL REVENUE $R_{ij}$ |
|---|---|---|---|
| 1 | 1 | 0 | 836.4 |
| 1 | 2 | 12 | 1060.2 |
| 1 | 3 | 25 | 1076.64 |
| 1 | 4 | 42 | 1152.36 |
| 1 | 5 | 52 | 1158.18 |
| 1 | 6 | 67 | 1207.54 |
| 1 | 7 | 74 | 1209.94 |
| 1 | 8 | 108 | 1228.92 |
| 2 | 1 | 114 | 275.94 |
| 2 | 2 | 131 | 405.72 |
| 2 | 3 | 134 | 465.34 |
| 2 | 4 | 140 | 549 |
| 2 | 5 | 149 | 603.9 |
| 2 | 6 | 156 | 636.32 |
| 2 | 7 | 159 | 653.31 |
| 2 | 8 | 161 | 693.62 |
| 2 | 9 | 164 | 709.08 |
| 2 | 10 | 168 | 715.76 |
| 2 | 11 | 171 | 724.62 |
| 3 | 1 | 0 | 480.96 |
| 3 | 2 | 20 | 687.4 |
| 3 | 3 | 40 | 710.32 |
| 3 | 4 | 49 | 758.27 |
| 3 | 5 | 64 | 762.24 |
| 3 | 6 | 74 | 790.16 |
| 3 | 7 | 114 | 800.1 |
| 4 | 1 | 0 | 664.8 |
| 4 | 2 | 8 | 808.99 |
| 4 | 3 | 30 | 858.95 |
| 4 | 4 | 42 | 1096.92 |
| 4 | 5 | 63 | 1105.38 |
| 4 | 6 | 70 | 1178.1 |
| 4 | 7 | 93 | 1221.57 |

TABLE 3

*Fig. 10A*

| GROUP ID $i$ | SCHEDULE ID $j$ | ENDING INVENTORY $I_{ij}$ | TOTAL REVENUE $R_{ij}$ |
|---|---|---|---|
| 5 | 1 | 6 | 442.26 |
| 5 | 2 | 18 | 472.71 |
| 5 | 3 | 41 | 543.09 |
| 5 | 4 | 55 | 701.15 |
| 5 | 5 | 63 | 710.66 |
| 5 | 6 | 76 | 777.36 |
| 5 | 7 | 82 | 782.1 |
| 5 | 8 | 94 | 829.28 |
| 5 | 9 | 108 | 833.36 |
| 5 | 10 | 119 | 839.28 |
| 5 | 11 | 121 | 839.32 |
| 5 | 12 | 125 | 871.7 |
| 6 | 1 | 0 | 550.41 |
| 6 | 2 | 13 | 576.72 |
| 6 | 3 | 29 | 736.39 |
| 6 | 4 | 54 | 748.7 |
| 6 | 5 | 56 | 802.24 |
| 6 | 6 | 75 | 802.43 |
| 6 | 7 | 80 | 836.8 |
| 6 | 8 | 117 | 858.54 |
| 7 | 1 | 9 | 545.16 |
| 7 | 2 | 22 | 590 |
| 7 | 3 | 53 | 696.2 |
| 7 | 4 | 58 | 859.04 |
| 7 | 5 | 66 | 877.92 |
| 7 | 6 | 79 | 949.9 |
| 7 | 7 | 85 | 961.7 |
| 7 | 8 | 97 | 1012.44 |
| 7 | 9 | 102 | 1014.8 |
| 7 | 10 | 114 | 1019.52 |
| 7 | 11 | 124 | 1028.96 |
| 7 | 12 | 129 | 1047.84 |

TABLE 4

*Fig. 10B*

| GROUP ID $i$ | SCHEDULE ID $j$ | ENDING INVENTORY $I_{ij}$ | TOTAL REVENUE $R_{ij}$ |
|---|---|---|---|
| 8 | 1 | 0 | 711 |
| 8 | 2 | 14 | 1005.7 |
| 8 | 3 | 25 | 1016.87 |
| 8 | 4 | 38 | 1032.5 |
| 8 | 5 | 43 | 1095.32 |
| 8 | 6 | 51 | 1100.97 |
| 8 | 7 | 61 | 1106.64 |
| 8 | 8 | 67 | 1153.91 |
| 8 | 9 | 73 | 1154.03 |
| 8 | 10 | 80 | 1156.4 |
| 8 | 11 | 105 | 1201.5 |

TABLE 4

| GROUP ID $i$ | SCHEDULE ID $s_i$ | ENDING INVENTORY $I_{is_j}$ | TOTAL REVENUE $R_{is_j}$ |
|---|---|---|---|
| 1 | 2 | 12 | 1060.2 |
| 2 | 8 | 161 | 693.62 |
| 3 | 2 | 20 | 697.4 |
| 4 | 4 | 42 | 1096.92 |
| 5 | 1 | 6 | 442.26 |
| 6 | 1 | 0 | 550.41 |
| 7 | 2 | 22 | 590 |
| 8 | 2 | 14 | 1005.7 |

TABLE 5

*Fig. 10C*

| GROUP ID i | SCHEDULE ID j | ORIGINAL ENDING INVENTORY $I_{ij}$ | ORIGINAL TOTAL REVENUE $R_{ij}$ | NEW ENDING INVENTORY $I'_{ij}$ | NEW TOTAL REVENUE $R'_{ij}$ |
|---|---|---|---|---|---|
| 1 | 2 | 12 | 1060.2 | 0 | 0 |
| 2 | 8 | 161 | 693.62 | 0 | 0 |
| 2 | 9 | 164 | 709.08 | 3 | 15.46 |
| 2 | 10 | 168 | 715.76 | 7 | 22.14 |
| 2 | 11 | 171 | 724.62 | 10 | 31 |
| 3 | 2 | 20 | 697.4 | 0 | 0 |
| 4 | 4 | 42 | 1096.92 | 0 | 0 |
| 5 | 1 | 6 | 442.26 | 0 | 0 |
| 6 | 1 | 0 | 550.41 | 0 | 0 |
| 7 | 2 | 22 | 590 | 0 | 0 |
| 8 | 2 | 14 | 1005.7 | 0 | 0 |
| 8 | 3 | 25 | 1016.87 | 11 | 11.17 |

TABLE 6

Fig. 10D

| GROUP ID | SCHEDULE ID | ENDING INVENTORY | TOTAL REVENUE |
|---|---|---|---|
| 1 | 2 | 12 | 1060.2 |
| 2 | 11 | 171 | 724.62 |
| 3 | 2 | 20 | 697.4 |
| 4 | 4 | 42 | 1096.92 |
| 5 | 1 | 6 | 442.26 |
| 6 | 1 | 0 | 550.41 |
| 7 | 2 | 22 | 590 |
| 8 | 2 | 14 | 1005.7 |

TABLE 7

Fig. 10E

SYSTEMS AND METHODS FOR MARKDOWN OPTIMIZATION WHEN INVENTORY POOLING LEVEL IS ABOVE PRICING LEVEL

TECHNICAL FIELD

This document relates generally to optimization of complex-problems having non-linear constraints, and more particularly to retail pricing optimization.

BACKGROUND

A significant problem that product retailers face is determining the best plan for liquidating inventory while maximizing revenue during a given sales period. For example, a fashion retailer may seek to maximize profits for a given clothing line during a predetermined sales season while meeting an inventory sales target, where only a certain percentage of beginning inventory remains unsold at the end of the season. This problem is sometimes referred to as a markdown optimization problem in retail practice and can involve identifying which products to mark down, how much to mark the products down, when to mark down the products, and/or in which markets and stores the markdowns should be taken.

SUMMARY

In accordance with the teachings provided herein, computer-implemented systems and methods are disclosed for generating a near-optimum product markdown plan for a plurality of uniform pricing levels having a required inventory sell-through target over all of the plurality of uniform pricing levels. Uniform pricing level data may be received for a uniform pricing level from a computer-readable data store. A plurality of feasible markdown schedules may be generated for the uniform pricing level, where each of the plurality of feasible markdown schedules meets all individual constraints for the uniform pricing level. All dominated feasible markdown schedules for the uniform pricing level may be removed to generate one or more candidate markdown schedules for the uniform pricing level. The near-optimum product markdown plan of one candidate markdown schedule for each of the plurality of pricing levels may be generated, where generating the near-optimum product markdown plan may include executing a limited exact algorithm solver for a plurality of iterations to generate a product markdown plan on each iteration, where a product markdown plan is selected as the near-optimum product markdown plan if the product markdown plan generates an expected revenue within a threshold percentage of a revenue bound, and a dynamic programming solver may be executed to generate the near-optimum product markdown plan if no product markdown plan generated by the limited exact algorithm solver is within the threshold percentage of the revenue upper bound. The near-optimum product markdown plan may then be stored in a computer-readable medium.

As another example, a system and method are configured to generate a near-optimum product markdown plan for a plurality of uniform pricing levels having a required inventory sell-through target over all of the plurality of uniform pricing levels. The system may include a computer-readable data store containing uniform pricing level data for a uniform pricing level. The system may further include a feasible markdown schedule generator configured to generate a plurality of feasible markdown schedules for the uniform pricing level, where each of the plurality of feasible markdown schedules meets all individual constraints for the uniform pricing level. The system may further include a dominated markdown schedule remover configured to remove all dominated feasible markdown schedules for the uniform pricing level to generate one or more candidate markdown schedules for the uniform pricing level, and a markdown heuristic solver configured to generate the near-optimum product markdown plan of one candidate markdown schedule for each of the plurality of uniform pricing levels. The markdown heuristic solver may further include a limited exact algorithm solver configured to execute for a plurality of iterations to generate a product markdown plan on each iteration, where a product markdown plan is selected as the near-optimum product markdown plan if the product markdown plan generates an expected revenue within a threshold percentage of a revenue upper bound. A dynamic programming solver may be configured to generate the near-optimum product markdown plan if no product markdown plan generated by the limited exact algorithm solver is a within the threshold percentage of the revenue upper bound. The system may further include computer-readable instructions for storing the near-optimum product markdown plan in a computer-readable medium.

BRIEF DESCRIPTION OF THE DRAWINGS

FIG. 9 depicts data tables used for a first markdown optimization problem example.

FIGS. 10A-10E depict data for a second markdown optimization problem example.

DETAILED DESCRIPTION

Figures 1, 2:
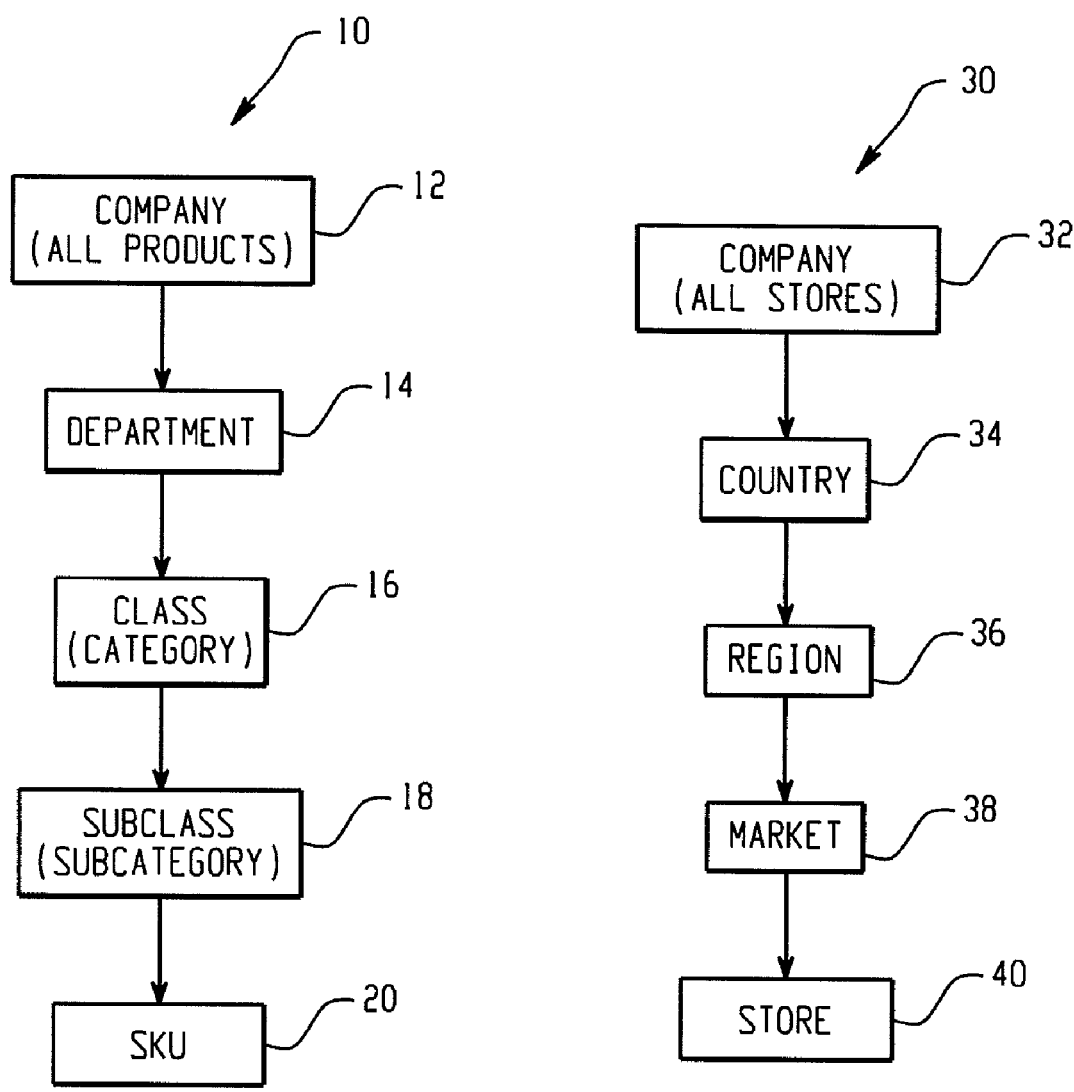
FIG. 1 depicts a block diagram of an example product hierarchy that may be utilized by a retailer.
FIG. 2 depicts a block diagram of an example location hierarchy that may be utilized by a retailer.

Retailers may utilize one or more hierarchies to represent their products, selling locations, and other business data. FIG. 1 depicts a block diagram of an example product hierarchy that may be utilized by a retailer. The highest level of the product hierarchy 10 is a company level 12 that contains all other nodes of the product hierarchy 10, which represent products sold within the company. The company level 12 holds one or more nodes at the department level 14. Nodes at the department level 14 may include a shoe department, a women's clothing department, a men's clothing department, a housewares department, etc. A class level 16 resides beneath the department level 14. The class level 16 in a women's clothing department may include winter clothing, spring clothing, summer clothing, and fall clothing. The class level 16 may be broken down into nodes of a subclass level 18, which may include summer slacks, summer skirts, bathing suits, etc. Finally, the subclass level 18 is divided into nodes representing individual stock-keeping units (SKUs) 20.

FIG. 2 depicts a block diagram of an example location hierarchy that may be utilized by a retailer. The location hierarchy 30 includes a company level 32 that stores all location sub-nodes for the company. A country level 34 resides below the company level 32, and a region level 36 is found below the country level 34 in the location hierarchy 30. A market level 38 is included after the region level 36, where the market level 38 includes nodes containing data aggregated at a market level, which may represent a single city or a portion of a larger city. Finally, a store level 40 appears beneath the market level 38 and contains nodes representing individual store locations.

Pricing may be done at any level of the product hierarchy and at any level of the location hierarchy. In one implementation, all product/location hierarchies in the same pricing level get the same pricing recommendation. This common level is referred to as a uniform pricing level.

Retailers often have sales targets which are specified as a percentage of their initial season starting inventory. For example, a retailer may want to sell at least 80% of its starting inventory. This goal may be referred to as an 80% sell through target. This target may be specified at a higher level than the uniform pricing level. The level at which the sell through target is set may be referred to as the inventory pooling level.

In other words, even though product/location groups may be priced separately, there is a common sell through target for a number of these product/location groups. For example, the uniform pricing level could be at the SKU-Market level, while the inventory pooling level could be set at the SKU-Company level with an 80% sell through target. This means that every SKU in each market may be priced separately, as long as the total sell through for that SKU is 80%.

Markdown optimization problems may become highly complex due to the introduction of a large number of product/location combinations and non-linear objectives and constraints. Having a sell through target at a higher level than the uniform pricing level further complicates the problem because product/location groups may not be priced independently of one another.

A method for handling a market optimization is to disaggregate (re-allocate) the higher level sell through target to the lower uniform pricing level, so that product/location groups can be solved independently. However this may sometimes result in sub-optimal solutions because some slow moving products may need to take an otherwise unnecessary deeper discount in order to meet their allocated individual inventory target and result in loss of revenues. For example, in a company having only two stores and a single SKU, each store forms a uniform pricing group. If the overall sell through target is 90%, and store A has a starting inventory of 100, and store B has a starting inventory of 200, then the retailer may apply the 90% target on each store, so the ending inventory target is 10 for store A and 20 for store B. After solving each pricing group with its own target, the retailer chooses a schedule that satisfies the 90% sell through target set for each of the individual stores. However, these markdown plans may not have been optimal. Store A could have chosen a less aggressive but more profitable markdown schedule, which has ending inventory of 12 units. Store B could then choose a more aggressive schedule having an ending inventory of 8. Although the first selection violates store A's individual inventory target, the total ending inventory of A and B is only 12+8=20, which meets the company-wide ending inventory target 30. Without an optimization system, a retailer may need to examine large numbers of combinations through trial and error to get a best result. For real-life applications that may involve tens of thousands pricing groups, it may be impossible to find the best solution within a reasonable time.

A goal of a markdown optimization operation may include finding periodic (e.g., hourly, daily, weekly, monthly, etc.) optimal prices, called a price schedule, for product/location combinations in order to maximize expected revenue. Expected revenue from a uniform pricing group, i, of product/locations in the clearance period may be represented as:

$$\sum_{k=1}^{N_i} \sum_{t=1}^{T} p_{k,t} s_{k,t},$$

Where $N_i$ is the number of product/locations to be priced in group i, T is the number of periods in the clearance period, $p_{k,t}$ is the price of product/location pair k in period t, and $s_{k,t}$ is the expected sales units of a product/location pair k in week t at price $p_{k,t}$.

The expected sales for a product/location combination in a sales period may depend on the available inventory and forcasted demand for that week. Forecasted demand may depend on a base forecast (i.e., a forecast without any price reduction), a price, and how elastic the demand of the product at a particular location is. This relationship may be mathematically written as:

$$s_{k,t} = \min\left(I_{k,t-1}, \alpha_{k,t} e^{\beta_k \left(\frac{p_{k,t}}{p_{k,0}} - 1\right)}\right) \forall\, k,\, t,$$

where $I_{k,t}$ is the inventory of product/location pair k at the end of week t, $p_{k,0}$ is the list price of product/location pair k, $\beta_k$ is the price response coefficient (i.e., price elasticity) of product/location pair k, and $\alpha_{k,t}$ is the base forecast at list price for product/location pair k in sales period t. The above equation assumes a log-linear demand model. Other demand models may also be used.

Certain constraints may also be incorporated into the markdown optimization. For example, sales period prices of each product/location pair $(p_{k,1}, p_{k,2}, \ldots, p_{k,T})$ may be required to follow certain business rules. Example business rules may include: successive sales period prices must be non-increasing; sales period prices must be chosen from a given set of admissible price points; an upper and/or lower bound on the amount of change in sales period price from one sales period to the next; a lower bound of a price change for a first markdown; an upper bound for the overall price change for the entire clearance horizon; limitations on the frequency of price changes such as maximum number of price changes, minimum weeks between two successive markdowns; limitations on dates of price changes such as certain dates that markdowns may not occur, dates by which a markdown must be taken; as well as others.

A linking constraint, such as the inventory sell through target, may also be incorporated into the markdown optimization. The linking constraint ties together different uniform pricing groups and makes the optimization more complicated by preventing separability of the problem. A sell through target may be represented as a constraint of the ending inventory. Where i is the uniform pricing group i=1, . . . , n, where n is the number of pricing groups in the consideration, the sell through constraint may be described as:

$$\sum_{i=1}^{n}\sum_{k=1}^{N_i} I_{i,k,T} \leq B,$$

where B is the ending inventory target. The ending inventory target may be represented as a percentage of the total starting inventory.

Figure 3:
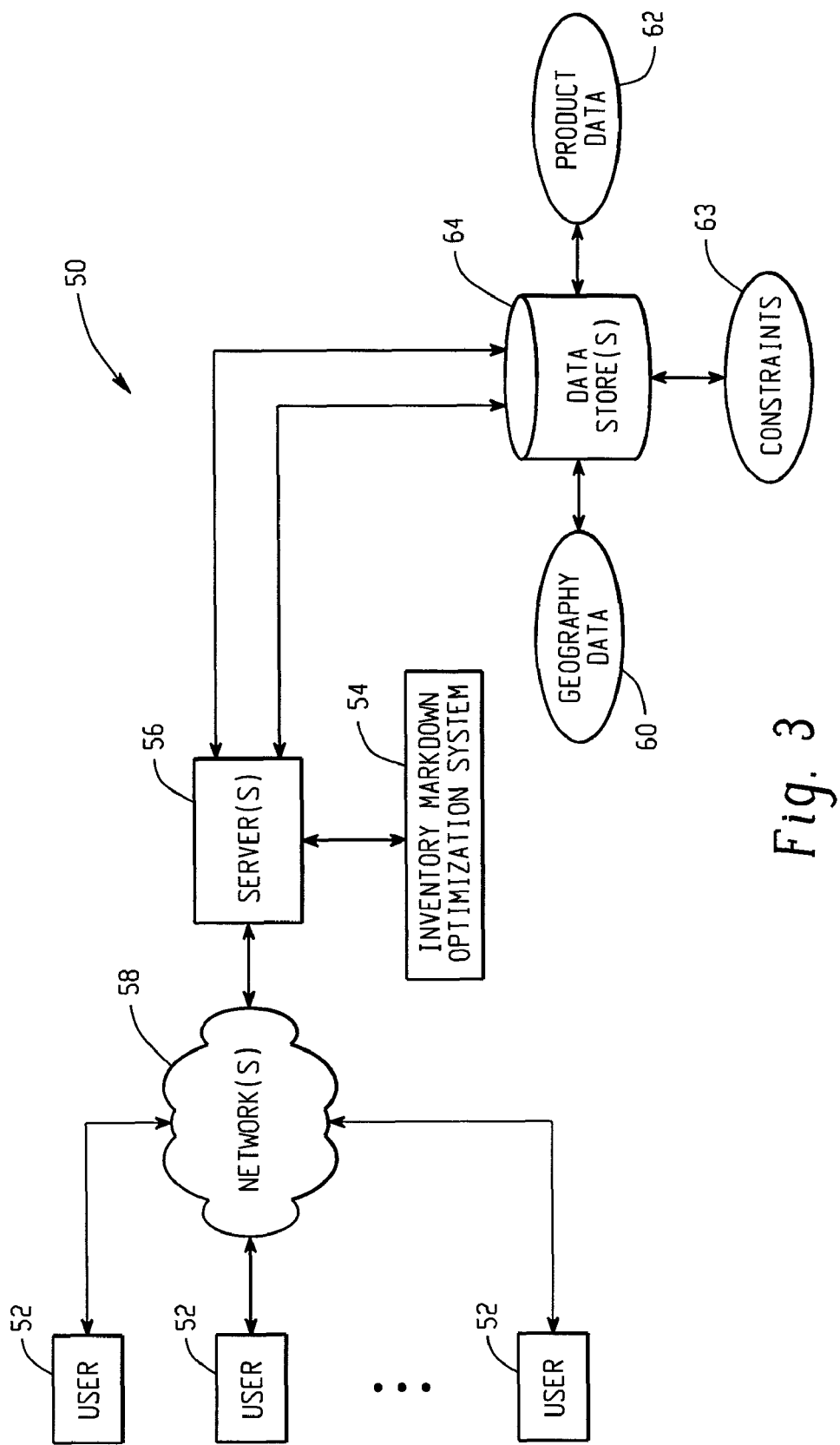
FIG. 3 depicts a computer-implemented environment where users can interact with an inventory markdown optimization system hosted on one or more servers through a network.

FIG. 3 depicts at 50 a computer-implemented environment where users 52 can interact with an inventory markdown optimization system 54 hosted on one or more servers 56 through a network 58. The system 54 contains software operations or routines for generating an optimum or a near-optimum product markdown plan utilizing geography data 60, product data 62, and constraints 63 housed in one or more data stores 64.

The inventory markdown optimization system 54 can be an integrated web-based analysis tool that provides users flexibility and functionality for performing inventory markdown optimization or can be a wholly automated system. The system 54 may also be implemented on a standalone computer or other platforms. One or more data stores 64 can store the data to be analyzed by the system 54 as well as any intermediate or final data generated by the system 54. For example, the data store(s) 64 can store geography data 60, product data 62, and constraints 63 that identify inventory levels, base sales volumes, price elasticity, local preferences, local demand, business constraints, linking constraints, etc. Examples of data store(s) 64 can include flat files, relational database management systems (RDBMS), a multi-dimensional database (MDDB), such as an Online Analytical Processing (OLAP) database, etc.

Figure 4:
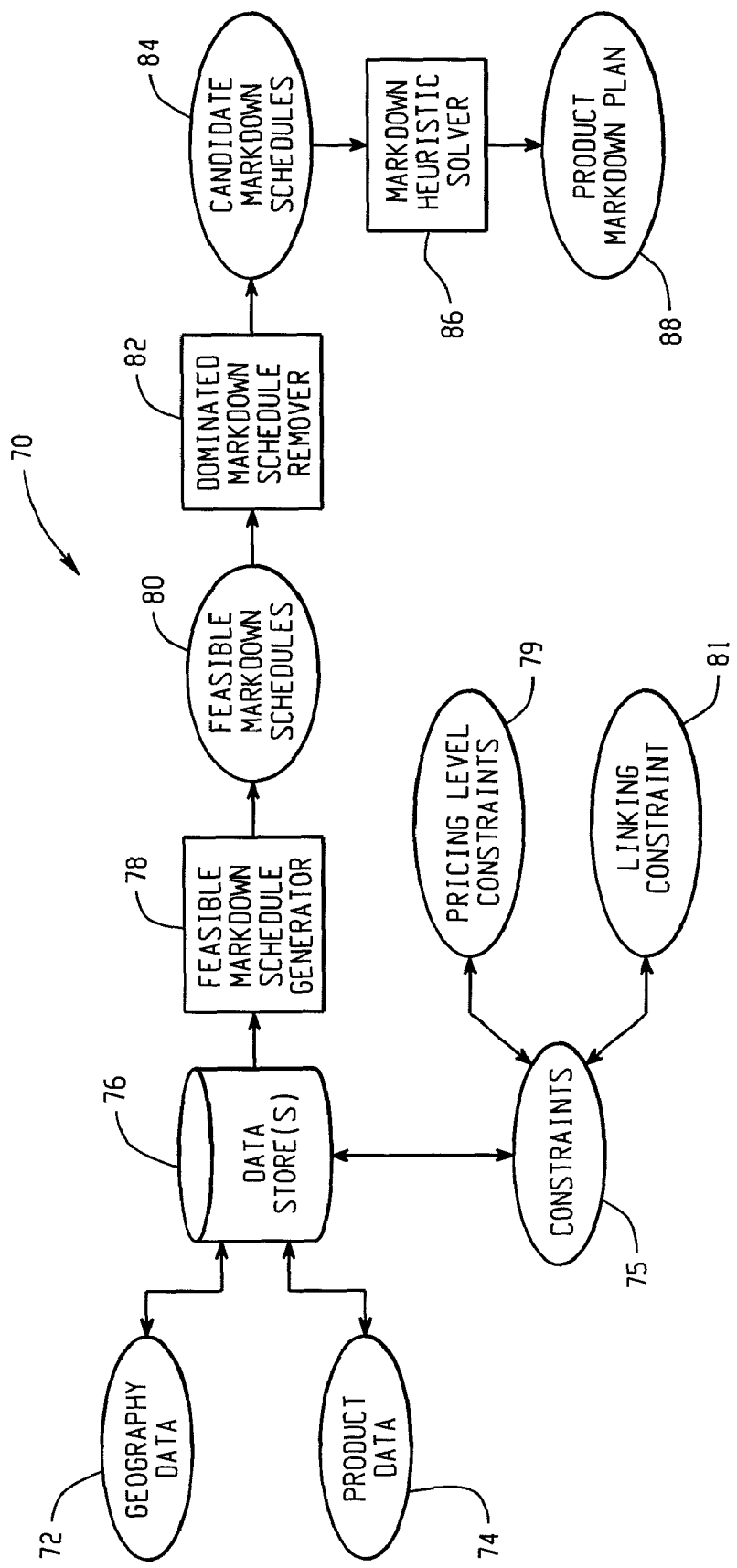
FIG. 4 is a block diagram depicting a three-stage decomposition approach for performing an inventory markdown optimization.

FIG. 4 is a block diagram depicting a three-stage decomposition approach for performing an inventory markdown optimization. Geography data 72, product data 74, and constraints 75 are received from one or more data stores 76 at a feasible markdown schedule generator 78. The feasible markdown schedule generator 78 solves each uniform pricing group individually to obtain a set of feasible markdown schedules 80 and their corresponding ending inventories and revenues, where each feasible markdown schedule 80 fulfills all pricing level constraints 79 without concern for linking constraints 81, such as an inventory pooling target. Each feasible markdown schedule 80 for uniform price group i may include the total revenue, $R_{ij}$, and ending inventory, $I_{ij}$, where j is the schedule's sequence identification number, which may be used to recover the corresponding price path information. The process of generating feasible markdown schedules is further described in U.S. patent application Ser. No. 11/937,103, filed on Nov. 8, 2007, and entitled "System and Method for Markdown Optimization," the entirety of which is herein incorporated by reference.

The generated feasible markdown schedules 80 for each pricing group are received by a dominated markdown schedule remover 82. For any group i, a schedule j with revenue $R_{ij}$ and ending inventory $I_{ij}$ is dominated by schedule k, if and only if $R_{ij} < R_{ik}$ and $I_{ij} \geq I_{ik}$. Because an un-dominated schedule offers better revenue and ending inventory performance, selection of un-dominated markdown schedules is preferable, and thus, dominated markdown schedules may be removed from the pool of feasible markdown schedules 80 to generate a set of candidate markdown schedules 84 containing un-dominated, feasible markdown schedules for each product/location. Dominated markdown schedules may be identified by sorting feasible markdown schedules 80 according to ending inventories in increasing order and then sequentially removing schedules whose revenues are less than or equal to that of the previous feasible markdown schedule.

The candidate markdown schedules 84 are received by a markdown heuristic solver 86 along with a linking constraint 81, such as an inventory pooling target. The markdown heuristic solver selects one candidate markdown schedule 84 for each of product/location to generate a near optimum product markdown plan 88.

Using the set of candidate markdown schedules $\{(R_{ij}, I_{ij}) \forall i, j\}$ 84, the markdown optimization may be executed with consideration of inventory pooling across multiple uniform pricing groups. The markdown optimization may be represented as:

$$V_n(B) := \max \sum_{i=1}^{n} \sum_{j=1}^{m_i} R_{ij} \cdot x_{ij},$$

subject to:

$$\sum_{i=1}^{n}\sum_{j=1}^{m_i} I_{ij} \cdot x_{ij} \leq B,$$

$$\sum_{j=1}^{m_i} x_{ij} = 1, \forall i, \text{ and}$$

$$x_{ij} \in \{0, 1\}, \forall i, j,$$

where n is the number of groups sharing the common inventory pooling, $m_i$ is the number of candidate markdown schedules for pricing group i, B is the total inventory pooling target, and $x_{ij}$ is the binary decision variable such that $x_{ij}=1$, if the j-th markdown schedule is selected for group i and $x_{ij}=0$ otherwise. The second constraint above indicates that for each uniform pricing group, one and only one price schedule may be selected. The goal is to maximize the total revenue, denoted by $V_n(B)$, subject to the total ending inventories among all groups not exceeding the pooling target, B.

The markdown optimization problem defined above may be recognized as a Multiple-Choice Knapsack Problem (MCKP). An MCKP is an NP-hard type problem, as the classical 0-1 knapsack problem is a special case of MCKP. Existing algorithms may be used to solve an MCKP to optimality. Example exact optimal solutions include the branch and bound algorithm by Prabhakant Sinha and Andris Zoltners, described in "The Multiple-Choice Knapsack Problem", *Operations Research*, Vol. 27, No. 3, 503-515 (1979), the entirety of which is herein incorporated by reference; and the minimal core algorithm by David Pisinger, described in "A Minimal Algorithm for the Multiple-Choice Knapsack Problem", *European Journal of Operational Research*, Vol. 83, No. 2, 394-410 (1995), the entirety of which is herein incorporated by reference. These exact solvers may perform well for some problem instances. However, for other problems, solving to optimality may take a significantly long period of time.

Figure 5:
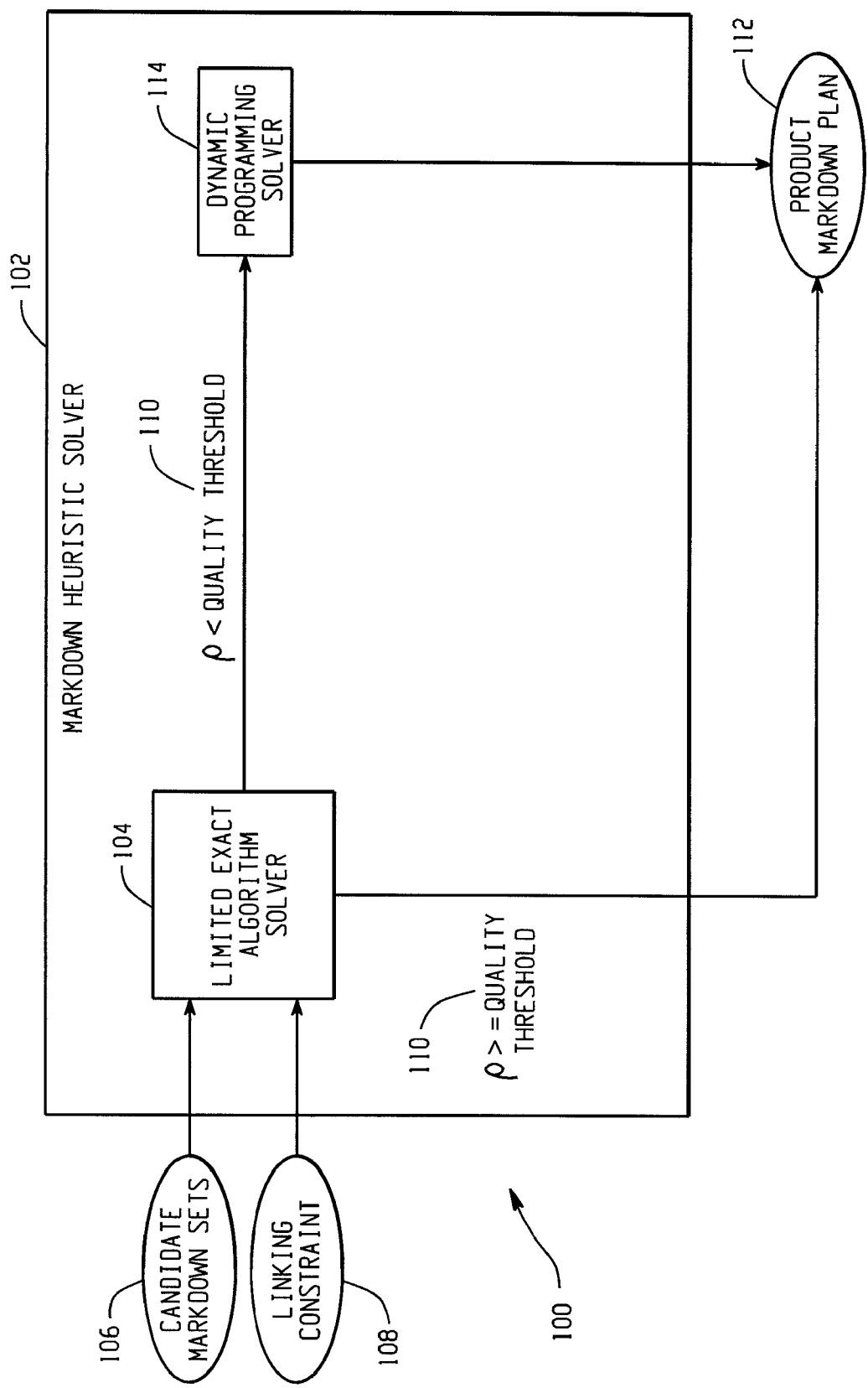
FIG. 5 is a block diagram depicting a markdown heuristic solver that uses a two-part solving algorithm for computing a product markdown plan from candidate markdown sets.

FIG. 5 is a block diagram depicting a markdown heuristic solver that uses a two-part solving algorithm for computing a product markdown plan from candidate markdown sets. It may often be the case that near-optimal solutions are satisfactory solutions of a markdown optimization. As noted above, for some problems, an exact algorithm, such as the Sinha-Soltners or Pisinger methods, may provide an exactly optimal solution in a limited amount of processing time. However, for other problems, finding such a solution may be very time consuming. The markdown heuristic solver 102 of FIG. 5 is able to take advantage of the best case scenarios for an exact algorithm solver while avoiding unacceptably large processing times for less advantageous scenarios.

A limited exact algorithm solver 104 receives candidate markdown sets 106 and a linking constraint 108. A quality calculation 110 is made following one or more iterations of the limited exact algorithm solver 104. The quality calculation may, for example, calculate the ratio of a revenue generated by an iteration of the exact algorithm solver 104 to a computed upper bound. If the quality of a solution from the limited exact algorithm solver 104 is greater than a quality threshold, then the solution from the limited exact algorithm solver 104 is output as the product markdown plan 112. If a solution having a quality ratio, $\rho$, greater than the quality threshold is not found, then further processing is performed by a dynamic programming solver 114 to generate a product markdown plan 112.

Figure 6:
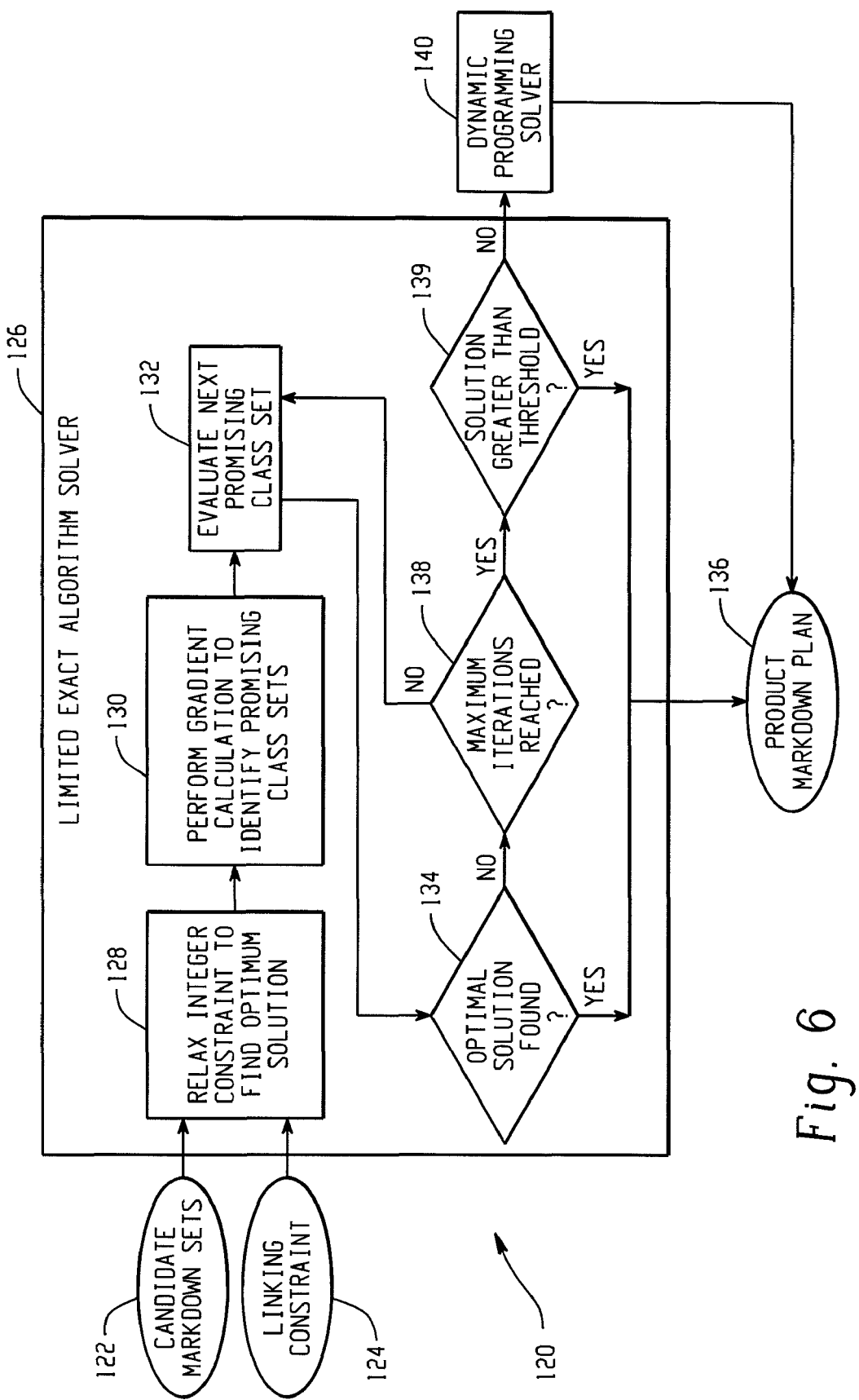
FIG. 6 is a block diagram depicting a limited exact algorithm solver.

FIG. 6 is a block diagram depicting a limited exact algorithm solver. A set of candidate markdown sets 122 and a linking constraint 124, such as an inventory pooling target, are received by the limited exact algorithm solver 126. The exact algorithm solver 126 computes an upper bound, or optimum solution, on total revenue based on the received candidate markdown sets 122 and linking constraint 124, as depicted at 128. This upper bound may be calculated by relaxing the 0,1 integer constraint for candidate markdown sets 122 in the solution.

The limited exact algorithm solver 126 then processes for a limited period of time or number of iterations to attempt to find a near optimum solution that is better than a quality threshold. For example, using the Pisinger method, a gradient calculation is performed at 130 to identify promising class sets of one markdown schedule for each product/location at the uniform pricing level per set that meet the linking constraint 124, ranking the class sets by their likelihood of giving a best solution. The limited exact algorithm solver 126 then evaluates the class sets in order at 132, computing a revenue value for each class set.

Following evaluation of one or more promising class sets at 132, a determination is made at 134 as to whether an integer optimal solution is found. If an integer optimal solution is found, then that optimum solution is outputted as the product markdown plan 136 and further processing is halted. If the solution calculated is not integer optimal, then a determination is made at 138 as to whether a maximum number of iterations has been reached. If a maximum number of iterations has not been reached, then the limited exact algorithm solver 126 continues evaluating promising class sets at 132. However, if a maximum number of iterations has been reached, then processing at the limited exact algorithm solver 126 is halted, and a quality determination is made at 139 using the promising class set evaluation that generates a highest revenue value.

For example, a quality ratio: $\rho := \hat{R}/\overline{R}$ where $\overline{R}$ is the upper bound of the total revenue, computed at 128, and $\hat{R}$ is the best solution found by the promising class set evaluations at 132, may be compared to a quality threshold to determine if further processing should be executed. For example, the quality ratio may be compared to a quality threshold of 0.98, which would determine that processing should cease if the best solution found generates 98% or more of the calculated upper bound of the total revenue. If a near-optimum solution is found at 139, then further processing is halted and the near-optimum solution is outputted as the product markdown plan 136. However, if a near-optimum solution is not found at 139, then the best class set price schedule evaluated by the limited exact algorithm solver 126 is provided to a dynamic programming solver 140 as a starting point for final computation of a product markdown plan 136.

Figure 7:
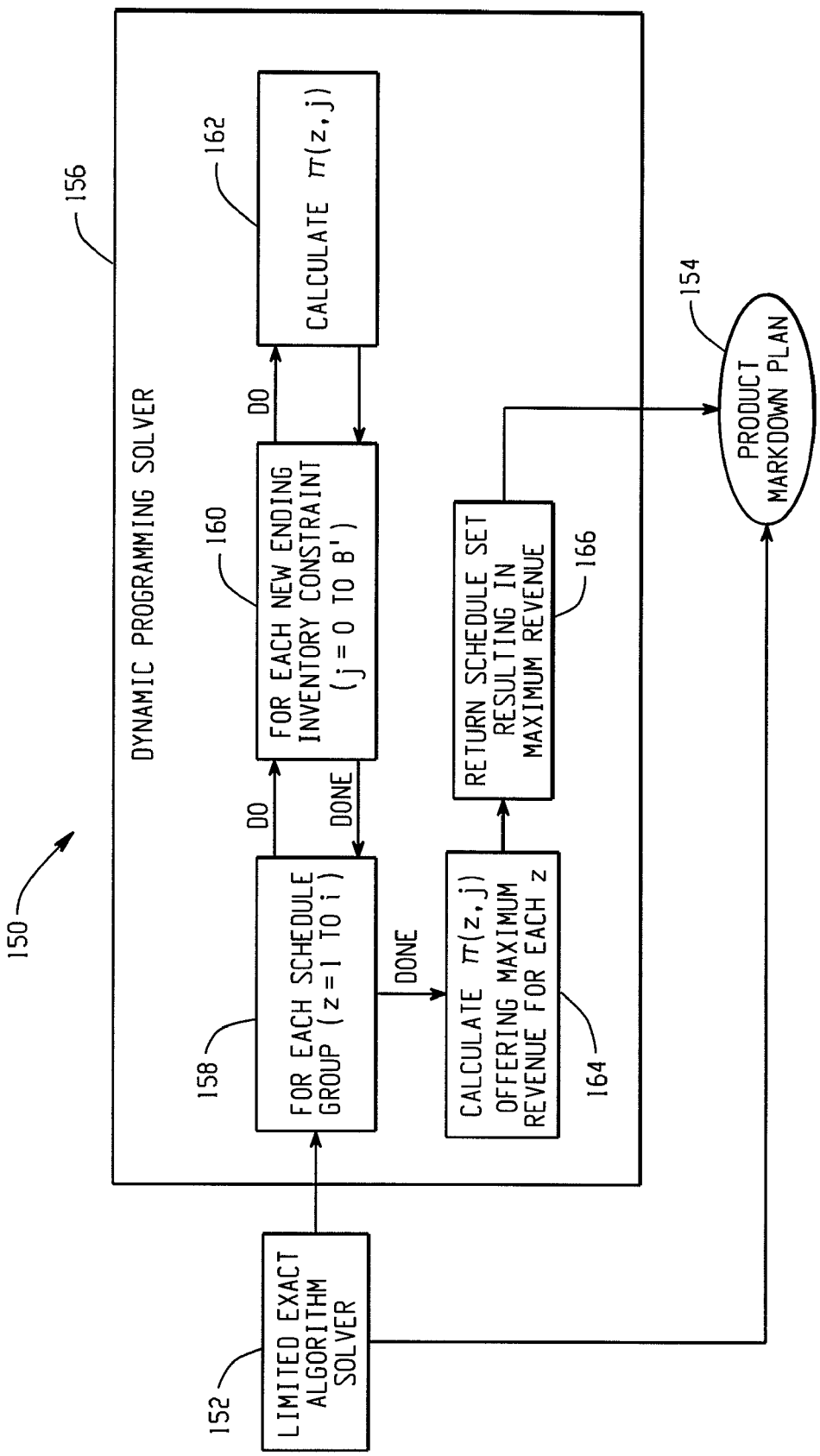
FIG. 7 depicts a calculation of a product markdown plan by a dynamic programming solver.

FIG. 7 depicts a calculation of a product markdown plan by a dynamic programming solver. As described with reference to FIG. 6, a limited exact algorithm solver 152 attempts to compute a product markdown plan 154 having a quality measurement greater than a quality threshold. If the limited exact algorithm 152 is unable to find such a solution, then the price schedule having the highest revenue calculated by the limited exact algorithm solver 152 is provided to the dynamic programming solver 156 for improvement.

Using the best effort price schedule from the limited exact algorithm solver 152, the dynamic programming solver 156 simplifies the inventory markdown problem by eliminating a number of candidate markdown sets. Denote by $s_i$ the index of the near-optimal price schedule chosen for group i by the exact algorithm solver after it is terminated. Thus, $R_{is_i}$ and $I_{is_i}$ are the corresponding near-optimal revenue and ending inventory, respectively, for group i, and thus $$\hat{R} = \sum_{i=1}^{n} R_{is_i}.$$

$$\text{Let } B' = B - \sum_{i=1}^{n} I_{is_i}.$$

For each group i, the dynamic programming solver 156 only considers a reduced set of schedule choices: $\Omega_i = \{j | I_{is_i} + B' \geq I_{ij} \geq I_{is_i}\}$. For each $j \in \Omega_i$, denote $R'_{ij} = R_{ij} - R_{is_i}$ and $I'_{ij} = I_{ij} - I_{is_i}$, and the dynamic programming solver solves the following problem:

$$v_n(B') := \max \sum_{i=1}^{n} \sum_{j \in \Omega_i} R'_{ij} \cdot x_{ij},$$

subject to:

$$\sum_{i=1}^{n} \sum_{j \in \Omega_i} I'_{ij} \cdot x_{ij} \leq B',$$

$$\sum_{j \in \Omega_i} x_{ij} = 1, \forall i,$$

$$x_{ij} \in \{0, 1\}, j \in \Omega_i, \forall i.$$

This new problem may have a much smaller set of possible candidates, as well as a reduced capacity B'. Assuming that the inventory target, B', and I'$_{ij}$ are integers, denote $v_i(z)$ as the maximum total revenue achieved by selecting one and only one schedule from each group from 1 to i with total ending inventories less than z. Then, the following iteration may be used to calculate the optimal value $v_n(B')$:

$$v_0(z) = 0,$$

$$\pi_i(z, j) := \begin{cases} R'_{i,j} + v_{i-1}(z - I'_{i,j}), & \text{if } I'_{i,j} \leq z \\ -\infty & \text{otherwise.} \end{cases}$$

$$v_i(z) = \max_{j \in \Omega_i} \{\pi_i(z, j)\},$$

$$\mu_i(z) = \operatorname*{argmax}_{j \in \Omega_i} \{\pi_i(z, j)\},$$

where z=0, 1, . . . , B', and i=1, . . . , n. The product markdown plan 154 may then be determined according to the following steps:
1. z=B',i=n.
2. let j=$\mu_i(z)$, then the final schedule for group i is the j-th schedule. Update z=z−I'$_{ij}$, i=i−1. If i=0, then stop. Otherwise repeat step 2.

The above iterative algorithm is depicted in FIG. 7, where upon receiving the index of the best effort price schedule, $s_i$, from the limited exact algorithm solver 152, for each schedule group, z=1 to i, at 158, for each new ending inventory constraint, j=0 to B', at 160, π(z,j) is calculated at 162. At 164, the π(z, j) offering maximum revenue for each z is calculated, and the schedule set resulting in the maximum revenue is returned at 166 as the product markdown plan 154.

Figure 8:
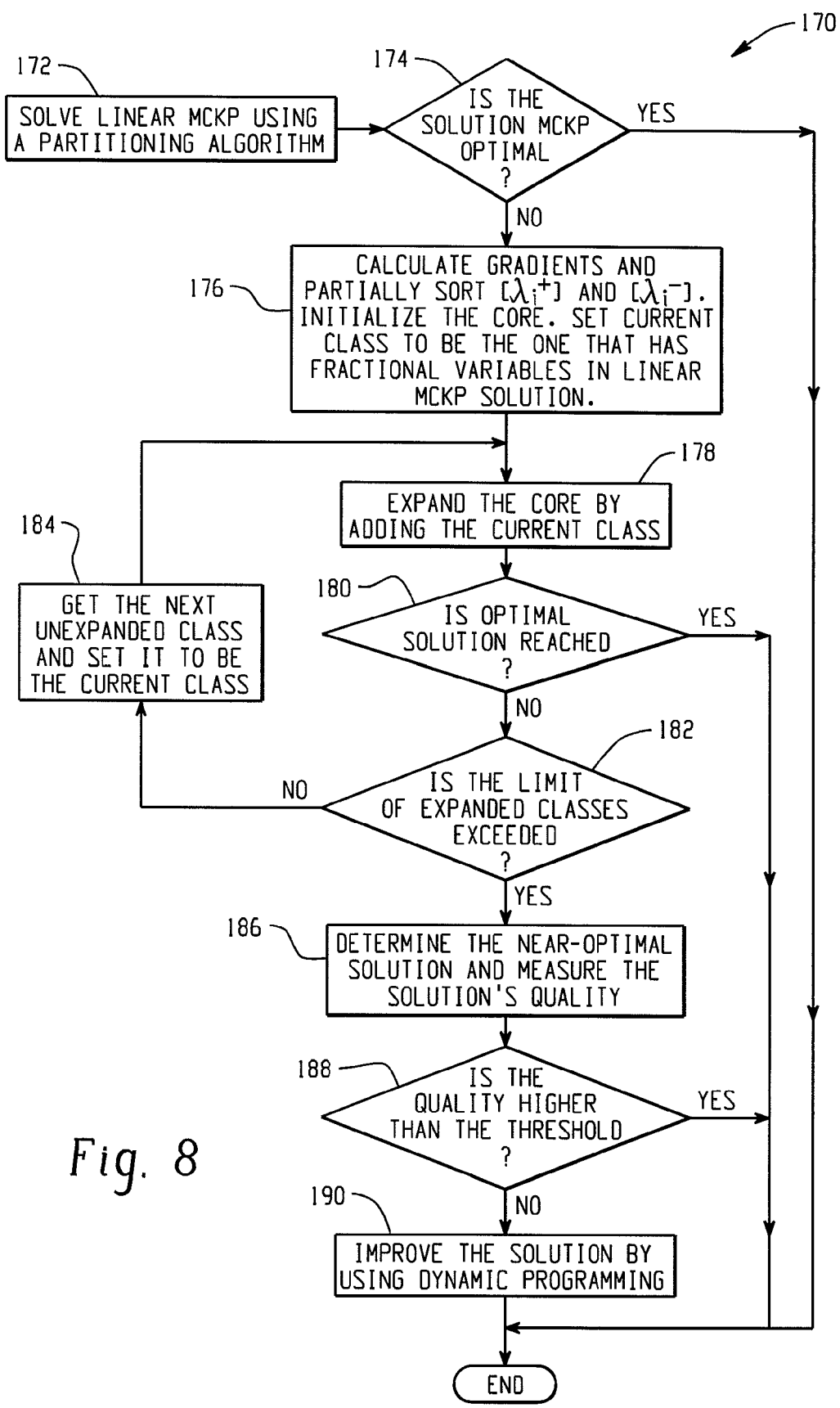
FIG. 8 is a flow diagram depicting computation of a near-optimum product markdown plan utilizing a two step approach implementing a Pisinger limited exact algorithm and a dynamic programming algorithm.

FIG. 8 is a flow diagram depicting computation of a near-optimum product markdown plan utilizing a two step approach implementing a Pisinger limited exact algorithm and a dynamic programming algorithm. At step 172, the limited exact algorithm solver begins processing by solving the MCKP problem to find an optimal solution by relaxing the 0,1 integer constraint for candidate markdown sets. It is possible that the optimal solution calculated in step 172 could still fulfill the relaxed 0,1 integer constraint. If the calculated optimal solution does fulfill the 0,1 integer constraint for candidate markdown sets, then an optimum solution has been found, and the yes branch is taken at step 174 and processing is completed. If such an optimum solution is not found, then a gradient calculation is performed at step 176 according to the Pisinger method, where gradients $\{\lambda_i^+\}$ and $\{\lambda_i^-\}$ are calculated and sorted to identify promising class sets. The class set evaluator core is initialized with the current class set as the class set having fractional variables in the linear MCKP solution.

The limited exact algorithm solver continues processing by expanding the core by adding the next promising class and evaluating at 178. The revenue computed via the class evaluation at 178 is used to determine if an optimal solution has been found at 180. If an optimal solution has been found, then that solution is output and processing ceases. If an optimal solution is not found, then a determination is made as to whether the limit on the number of iterations has been reached at 182. If the limit has not been reached, then the next unexpanded class is set as the current class at 184, and the core expansion and evaluation is repeated at 178. If the iteration limit has been reached at 182, then an evaluation of the best solution generated by the limited exact algorithm solver is performed at 186 to calculate a quality ratio. If the quality ratio is greater than a quality threshold, then the best solution generated by the limited exact algorithm solver is output as a near-optimum solution and processing ceases at 188. If a near-optimum solution is not computed by the limited exact algorithm solver, then the best effort solution is improved at 190 using a dynamic programming algorithm.

FIG. 9 depicts data for a first markdown optimization problem example. As depicted in FIG. 9, a retailer has two stores (A and B). In this example, the retailer wishes to clear a product off of his shelves within two weeks with a sell through target of 90%. To accomplish this, the retailer plans to take markdowns on the products. Markdowns for the two stores may be different. Thus, each store forms a uniform pricing group. The initial inventories are 100 at store A and 200 at store B, and the product is currently being sold at $30 at both stores. The allowed markdown price points are $20 and $10. Based on the product's attributes and store sales history, it is estimated that the product's demand follows a log-linear model with the price elasticity at −1.1 at store A and −2 at store B. Moreover, the baseline forecasts (i.e., demands if the current price is unchanged) are 25 units in each of the next two weeks for store A and 40 units in week 1 and 30 units in week 2 for store B. The markdown optimization seeks to determine the optimal markdown prices at each store in each week to maximize revenue while meeting the sell through target of at least 90% of the total inventories by the end of the second week.

The product markdown plan calculation begins by solving the pricing problem for each store individually by ignoring the sell through target. Table 2, depicted in FIG. 9, illustrates all of the price schedules for each store that fulfill all of the non-linking constraints with corresponding weekly prices, sales, total revenues, and ending inventories. In this example, there are six possible price schedules, indexed from 1 to 6, for each store. For example, price schedule 5 for store A has markdown prices of $20 in the first week and $10 in the second week, with corresponding weekly sales at 36 and 52 respectively. This results in a total revenue of $1,240 and ending inventory of 12.

Next, dominated schedules are removed for each pricing group. As described above, a dominated schedule is one that has a lower revenue and higher ending inventory than another schedule for a product/location. In this example, all six of the schedules for store A are un-dominated. For store B, schedules 1, 2, and 3 are dominated by schedule 5, as they all have higher ending inventories than schedule 5 with lower revenues. Thus, for store B, schedules 4, 5, and 6 are un-dominated.

Following removal of dominated schedules, the product markdown plan is generated using the two-step approach described above. The inventory pooling constraint is that the total ending inventories at store A and B cannot exceed (100+200)*(1−0.9)=30. Because only two pricing groups are involved, the Pisinger method is able to guarantee that the markdown problem is solved optimally after the core expands to two classes. The final solution is implementing schedule 5 for both stores, whereas the sum of ending inventories is 12+8=20, and total revenues are $1,240+$2,700=$3,940.

FIGS. 10A-10E depict data for a second markdown optimization problem example. In this example, the best effort solution of the limited exact algorithm solver is improved by the dynamic programming after the limited exact algorithm is terminated with only a few groups enumerated. In this example, there are eight pricing groups sharing a common inventory target. The feasible markdown schedule generator and the dominated markdown schedule remover are applied to generate feasible markdown schedules and un-dominated candidate markdown schedules, respectively. The un-dominated candidate markdown schedules are listed in Tables 3 and 4 on FIGS. 10A-10C. Tables 3 and 4 show these price schedules along with their corresponding revenues and ending inventories. The inventory pooling target for this example is B=288.

The limit on the number of groups (classes) to be expanded in the limited exact algorithm is two, and the threshold for the optimality ratio is 0.99. Following two iterations in the limited exact algorithm solver, the algorithm is terminated with a best effort solution depicted in Table 5 in FIG. 10C. The best effort solution has a total revenue of $6,136.51, with a total ending revenue of 277. The upper bound of the revenue is $6245.58, which is calculated by solving the markdown optimization problem with the 0,1 integer constraint for candidate markdown sets relaxed. Thus, the quality ratio is calculated as $\rho=6136.51/6245.58\approx0.98$. This quality ratio is less than the threshold of 0.99, so the best effort solution is sought to be improved upon using the dynamic programming algorithm.

The dynamic programming algorithm assigns B'=288−277=11. For each group i, only the reduced set of schedule choices $\Omega_i=\{j|I_{is_i}+B'\geq I_{ij}\geq I_{is_i}\}$ are considered. For each $j \in \Omega_i$, $R'_{ij}=R_{ij}-R_{is_i}$ and $I'_{ij}=I_{ij}-I_{is_i}$ are calculated. After making these calculations, only groups 2 and 8 have more than one schedule in the reduced sets, and the rest of the groups have just one schedule choice, which significantly reduces the size of the dynamic program. Table 6, shown in FIG. 10D, lists the remaining schedule choices along with the original and new ending inventories and revenues. According to the dynamic programming equations, $v_1(z)=v_0(z)=0$ and $\mu_1(z)=2$, $z=0, 1, \ldots, 11$ because there is only one choice, schedule 2, for group 1. For group 2, one schedule from four options is to be chosen. Applying the dynamic programming equations:

$$v_2(z) = \begin{cases} 0, & z=0,1,2; \\ 15.46, & z=3,4,5,6; \\ 22.14, & z=7,8,9; \\ 31, & z \geq 10. \end{cases}$$

Correspondingly, $$\mu_2(z) = \begin{cases} 8, & z=0,1,2; \\ 9, & z=3,4,5,6; \\ 10, & z=7,8,9; \\ 11, & z \geq 10. \end{cases}$$

For groups $i=3, \ldots, 7$, there is only one choice. Thus, $v_i(\bullet)=v_2(\bullet)$, and $\mu_i(\bullet)=s_i$ (i.e., 2, 4, 1, 1, 2, respectively). For group 8, $z=0, \ldots, 10$, $v_8(z)=v_7(z)$, $\mu_8(z)=2$, and for $z=11$, $v_8(11)=31$, $\mu_8(11)=2$. The final choices are obtained by applying the final two steps of the dynamic programming algorithm:
1. z=B',i=n.
2. let $j=\mu_i(z)$, then the final schedule for group i is the j-th schedule. Update $z=z-I'_{ij}$, $i=i-1$. If $i=0$, then stop. Otherwise repeat step 2.

The resulting final product markdown plan is shown in Table 7 in FIG. 10E. The final product markdown plan has a total ending inventory of 287 and revenue of $6167.51. This final product markdown plan offers an increase of $31 in revenue over the best effort solution of the limited exact algorithm solver by substituting schedule 11 for schedule 8 for group 2.

Figure 11:
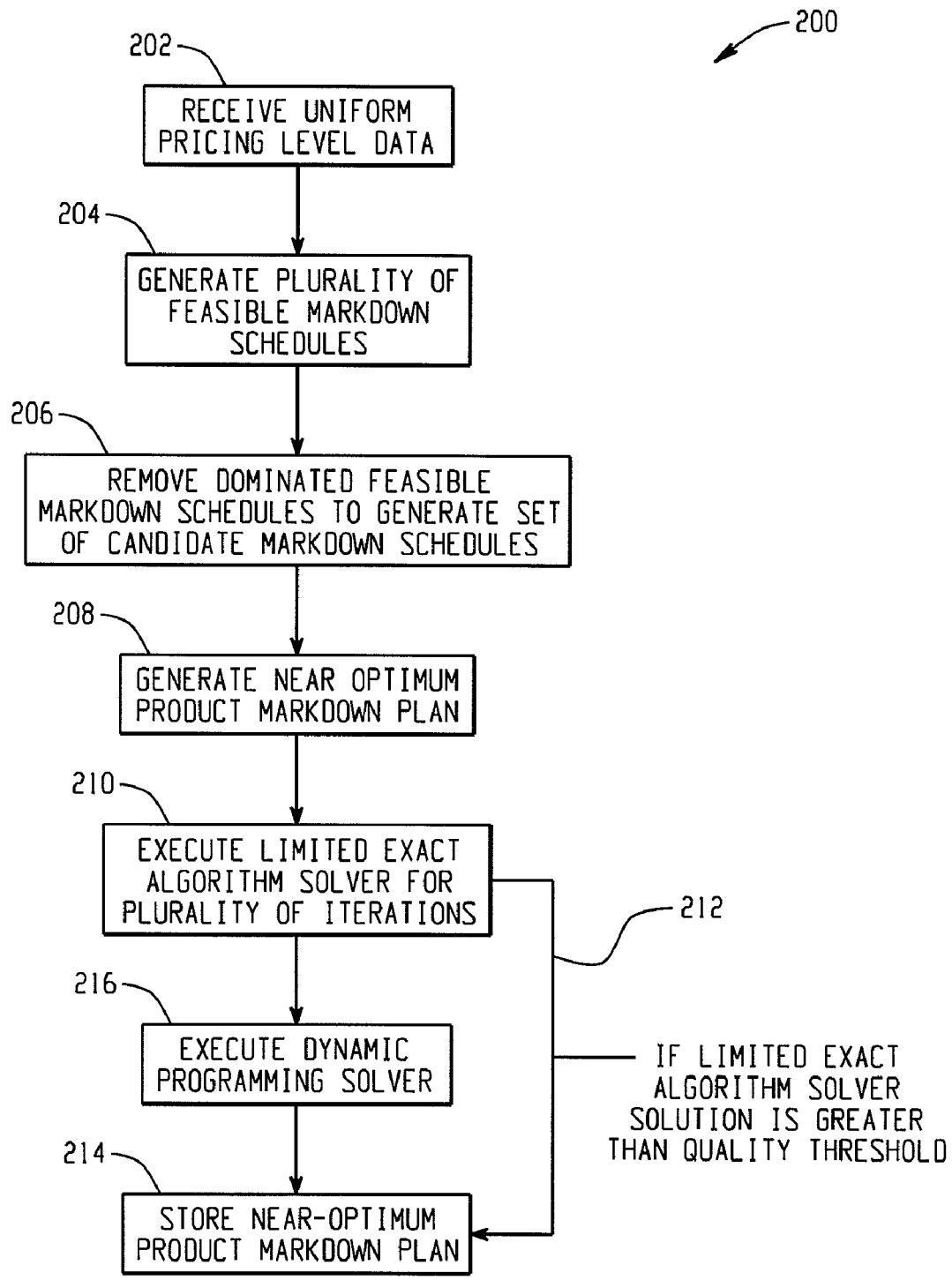
FIG. 11 is a flow diagram depicting a method for generating a near-optimum product markdown plan for a plurality of uniform pricing levels having a required inventory sell-through target over all of the plurality of uniform pricing levels.

FIG. 11 is a flow diagram depicting a method for generating a near-optimum product markdown plan for a plurality of uniform pricing levels having a required inventory sell-through target over all of the plurality of uniform pricing levels. Uniform pricing level data for a uniform pricing level is received from a computer-readable data store at 202. At 204, a plurality of feasible markdown schedules are generated for the uniform pricing level, where each of the plurality of feasible markdown schedules meets all individual constraints for the uniform pricing level. All dominated feasible markdown schedules are removed at 206 to generate one or more candidate markdown schedules for the uniform pricing level. At 208, the near-optimum product markdown plan of one candidate markdown schedule for each of the plurality of uniform pricing levels is generated, where the generating includes executing a limited exact algorithm solver for a plurality of iterations to generate a product markdown plan on each iteration at 210. If the product markdown plan generates an expected revenue within a threshold percentage of a revenue upper bound, then the product markdown plan is selected as the near-optimum product markdown plan, as shown at 212, and the near-optimum product markdown plan is stored in a computer-readable memory at 214. If a product markdown plan that meets the quality threshold is not found, then a dynamic programming solver is executed at 216 to generate the near-optimum product markdown plan, which is then stored in a computer-readable medium at 214.

Figure 12:
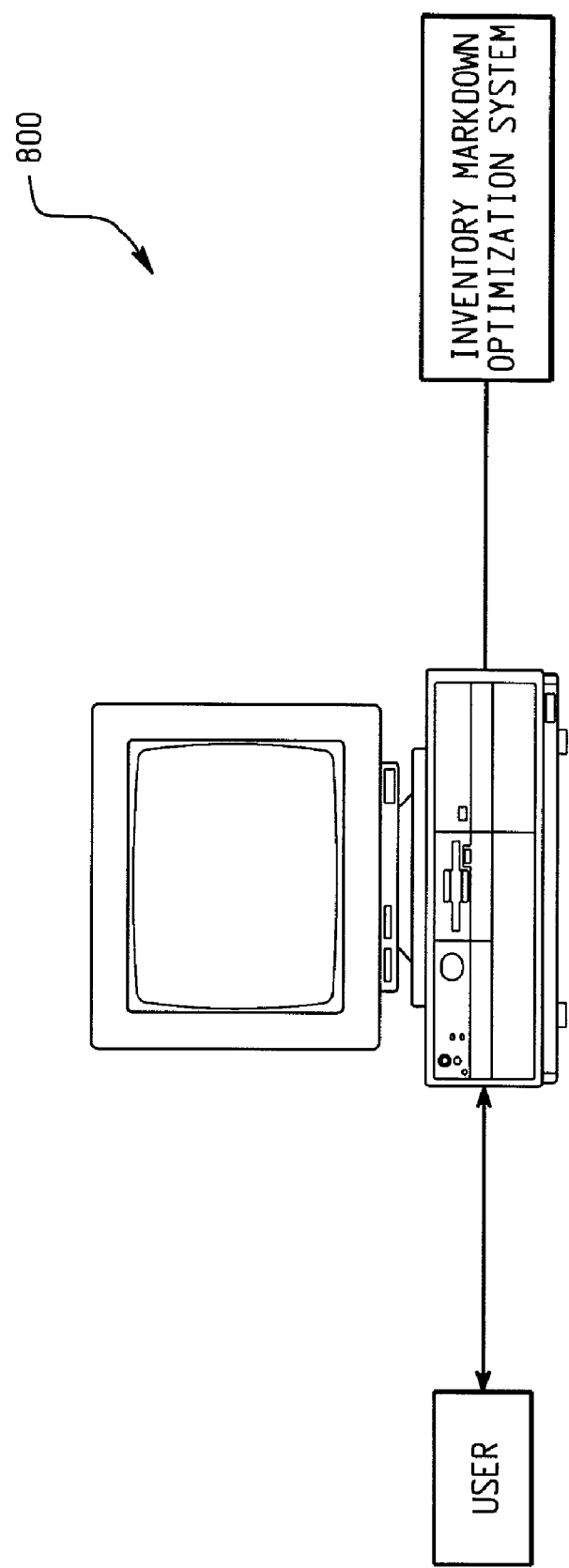
FIG. 12 is a block diagram depicting an environment wherein requesters can interact with an inventory markdown optimization system.

While examples have been used to disclose the invention, including the best mode, and also to enable any person skilled in the art to make and use the invention, the patentable scope of the invention is defined by claims, and may include other examples that occur to those skilled in the art. Accordingly, the examples disclosed herein are to be considered non-limiting. As an illustration, the systems and methods may be implemented on various types of computer architectures, such as for example on a single general purpose computer or workstation (as shown at 800 on FIG. 12), or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for selecting a product markdown plan, comprising:
   receiving, by one or more data processors, candidate data corresponding to a plurality of candidate markdown sets that detail schedules for marking down prices of one or more products;
   receiving, by the one or more data processors, constraints data, wherein the constraints data includes individual constraints that apply to a single candidate markdown set, and wherein the constraints data includes a linking constraint that applies to the plurality of candidate markdown sets;
   generating, by the one or more data processors, candidate markdown schedules for each of the candidate markdown sets, wherein each candidate markdown schedule conforms to applicable individual constraints;
   generating, by the one or more data processors, one or more class sets, wherein each class set includes a candidate markdown schedule, and wherein each class set conforms to the linking constraint;
   evaluating, by the one or more data processors, the one or more class sets, wherein the evaluations are iterative, and wherein each evaluation iteration includes computing an expected revenue value for a class set;
   computing, by the one or more data processors, a revenue upper bound using the candidate markdown schedules and the linking constraint;
   terminating, by the one or more data processors, the evaluation when a threshold number of iterations is reached, wherein the terminating includes determining a class set with a highest expected revenue value within a threshold of the revenue upper bound; and
   selecting, by the one or more data processors, a product markdown plan, wherein the product markdown plan includes the class set with the highest expected revenue value.

2. The method of claim 1, wherein terminating further includes:
   determining a class set with an expected revenue value that conforms to the revenue upper bound.

3. The method of claim 1, wherein terminating further includes:
   selecting a product markdown plan using a dynamic programming solver when no product markdown plan is selected.

4. The method of claim 1, further comprising:
   identifying, using the one or more data processors, dominated markdown schedules among the candidate markdown schedules, wherein the dominated markdown schedules are removed.

5. The method of claim 1, further comprising:
   ranking, using the one or more data processors, the one or more class sets according to a revenue generation likelihood, wherein the one or more class sets are evaluated according to rank.

6. The method of claim 1, wherein the threshold of the revenue upper bound is based upon a percentage of the revenue upper bound.

7. The method of claim 6, wherein the percentage is a predetermined percentage.

8. The method of claim 1, wherein inventory is liquidated based upon the selected product markdown plan.

9. The method of claim 1, wherein computing further comprises:
   relaxing a 0,1 integer constraint for all candidate markdown schedules; and
   solving for an exact optimum product markdown plan.

10. The method of claim 1, wherein generating one or more class sets includes using a gradient calculation to identify promising sets of the candidate markdown schedules.

11. The method of claim 3, wherein the dynamic programming solver operates on a reduced set of candidate markdown schedules.

12. The method of claim 11, wherein the reduced set of candidate markdown schedules includes only candidate markdown schedules that offer better expected inventory and higher expected revenue than the selected product markdown plan.

13. The method of claim 12, wherein the dynamic programming solver implements an iterative calculation to select the product markdown plan from the reduced set of candidate markdown schedules.

14. The method of claim 13, wherein the iterative calculation uses each of a plurality of uniform pricing levels and each of a plurality of revised ending inventory constraint values.

15. The method of claim 14, wherein for each of the z uniform pricing levels i and for each of the j revised ending inventory constraint values B', a revenue value $\pi$ is calculated such that:

$$\pi(z,j) = R'_{i,j} + v_{i-1}(z - I'_{i,j})$$

where $R'_{i,j} = R_{i,j} - R_{i,si}$,
where $R_{i,j}$ is an expected revenue value for the $j^{th}$ candidate markdown schedule for the $i^{th}$ uniform pricing level,
where $R_{i,si}$ is an expected revenue value for the candidate markdown schedule for the $i^{th}$ uniform pricing level included in the class set with the highest expected revenue value,
where $I'_{i,j} = I_{i,j} - I_{i,si}$,
where $I_{i,j}$ is an unsold inventory value for the $j^{th}$ candidate markdown schedule for the $i^{th}$ uniform pricing level,
where $I_{i,si}$ is an unsold inventory value for the candidate markdown schedule for the $i^{th}$ uniform pricing level included in the class set with the highest expected revenue value, where $v_i(z) = \max\{\pi(z,j)\}$, and where $v_0(z) = 0$.

16. The method of claim 1, wherein the candidate data is hierarchically arranged.

17. A system for selecting a product markdown plan, comprising:

one or more processors;

one or more computer-readable storage mediums containing instructions configured to cause the one or more processors to perform operations including:

receiving candidate data corresponding to a plurality of candidate markdown sets that detail schedules for marking down prices of one or more products;

receiving constraints data, wherein the constraints data includes individual constraints that apply to a single candidate markdown set, and wherein the constraints data includes a linking constraint that applies to the plurality of candidate markdown sets;

generating candidate markdown schedules for each of the candidate markdown sets, wherein each candidate markdown schedule conforms to applicable individual constraints;

generating one or more class sets wherein each class set includes a candidate markdown schedule, and wherein each class set conforms to the linking constraint;

evaluating the one or more class sets, wherein the evaluations are iterative, and wherein each evaluation iteration includes computing an expected revenue value for a class set;

computing a revenue upper bound using the candidate markdown schedules and the linking constraint;

terminating the evaluation when a threshold number of iterations is reached, wherein the terminating includes determining a class set with a highest expected revenue value within a threshold of the revenue upper bound; and selecting a product markdown plan, wherein the product markdown plan includes the class set with the highest expected revenue value.

18. A computer-program product for selecting a product markdown plan, tangibly embodied in a machine-readable storage medium, including instructions configured to cause a data processing apparatus to:

receive candidate data corresponding to a plurality of candidate markdown sets that detail schedules for marking down prices of one or more products;

receive constraints data, wherein the constraints data includes individual constraints that apply to a single candidate markdown set, and wherein the constraints data includes a linking constraint that applies to the plurality of candidate markdown sets;

generate candidate markdown schedules for each of the candidate markdown sets, wherein each candidate markdown schedule conforms to applicable individual constraints;

generate one or more class sets wherein each class set includes a candidate markdown schedule, and wherein each class set conforms to the linking constraint;

evaluate the one or more class sets, wherein the evaluations are iterative, and wherein each evaluation iteration includes computing an expected revenue value for a class set;

compute a revenue upper bound using the candidate markdown schedules and the linking constraint;

terminate the evaluation when a threshold number of iterations is reached, wherein the terminating includes determining a class set with a highest expected revenue value within a threshold of the revenue upper bound; and select a product markdown plan, wherein the product markdown plan includes the class set with the highest expected revenue value.

* * * * *